(12) United States Patent
Atak

(10) Patent No.: US 10,887,149 B2
(45) Date of Patent: Jan. 5, 2021

(54) METHOD FOR BLOCK CAPACITY EQUALIZATION AND OPTIMIZATION

(71) Applicant: ASELSAN ELEKTRONIK SANAYI VE TICARET ANONIM SIRKETI, Ankara (TR)

(72) Inventor: Oguzhan Atak, Ankara (TR)

(73) Assignee: ASELSAN ELEKTRONIK SANAYI VE TICARET ANONIM SIRKETI, Ankara (TR)

(*) Notice: Subject to any disclaimer, the term of this patent is extended or adjusted under 35 U.S.C. 154(b) by 0 days.

(21) Appl. No.: 16/769,248

(22) PCT Filed: Dec. 28, 2017

(86) PCT No.: PCT/TR2017/050718
§ 371 (c)(1),
(2) Date: Jun. 3, 2020

(87) PCT Pub. No.: WO2019/132791
PCT Pub. Date: Jul. 4, 2019

(65) Prior Publication Data
US 2020/0382358 A1    Dec. 3, 2020

(51) Int. Cl.
*H04L 27/34* (2006.01)
*H04L 1/00* (2006.01)

(52) U.S. Cl.
CPC ........ *H04L 27/3405* (2013.01); *H04L 1/0041* (2013.01); *H04L 1/0058* (2013.01)

(58) Field of Classification Search
CPC . H04L 27/3405; H04L 1/0041; H04L 1/0058; H04L 1/0071; H04L 1/0057; H04L 1/0045; H04L 2001/0093; H04L 5/0007; H04L 1/0042; H04L 27/2602; H04L 27/2613; H04L 27/2627; H04L 5/0048; H04L 1/005; H04L 1/009; H04L 27/2647;
(Continued)

(56) References Cited

U.S. PATENT DOCUMENTS

| 9,843,377 B2* | 12/2017 | Yeo ................. H04W 24/08 |
| 2011/0268176 A1* | 11/2011 | Jeong ................. H04N 19/30 |
| | | 375/240.01 |

(Continued)

FOREIGN PATENT DOCUMENTS

| EP | 2957084 B1 | 4/2017 |
| GB | 2523999 A | 9/2015 |

OTHER PUBLICATIONS

Alex Alvarado, et al., Exploiting UEP in QAM-Based BICM: Interleaver and Code Design, IEEE Transactions on Communications, Feb. 1, 2010, pp. 500-510, vol. 58, No. 2, IEEE Service Center, Piscataway, NJ. USA.
(Continued)

*Primary Examiner* — Freshteh N Aghdam
(74) *Attorney, Agent, or Firm* — Bayramoglu Law Offices LLC

(57) ABSTRACT

A method for equalizing the capacity of blocks to increase performance and decrease wasted power of a communication system is disclosed. The method equalizes the capacity of the blocks by increasing the power of the blocks which have smaller capacity than the average capacity and decreases the power of the blocks which have larger capacity than the average capacity.

2 Claims, 16 Drawing Sheets

(58) Field of Classification Search
CPC ..... H04L 1/007; H04L 1/0075; H04L 27/265; H04L 27/34; H04L 27/3422; H04L 1/00; H04L 1/0047; H04L 1/0052; H04L 1/0065; H04L 1/0068; H04L 1/0072; H04L 1/08; H04L 27/2628; H04L 27/2649; H04L 27/366; H04L 5/005; H04L 69/22; H04L 12/18; H04L 12/1877; H04L 12/189; H04L 1/0043; H04L 1/0048; H04L 1/0054; H04L 1/0055; H04L 1/0059; H04L 1/006; H04L 1/0061; H04L 1/0063; H04L 1/0083; H04L 1/04; H04L 1/0606; H04L 1/0631; H04L 1/0656; H04L 2025/03414; H04L 2025/0342; H04L 2025/03426; H04L 25/0204; H04L 25/022; H04L 25/0224; H04L 25/0256; H04L 25/03171; H04L 25/03197; H04L 25/03203; H04L 25/03216; H04L 25/03318; H04L 25/067; H04L 27/02; H04L 27/26; H04L 27/2601; H04L 27/2605; H04L 27/2607; H04L 27/2608; H04L 27/2614; H04L 27/2615; H04L 27/2618; H04L 27/2621; H04L 27/2626; H04L 27/2634; H04L 27/2666; H04L 27/3433; H04L 27/345; H04L 27/38; H04L 45/74; H04L 5/00; H04L 5/0023; H04L 5/0026; H04L 5/0044; H04L 5/0053; H04L 5/006; H04L 65/4076; H04L 69/10; H03M 27/3405; H03M 1/0041; H03M 1/0058; H03M 13/255; H03M 13/1165; H03M 13/2778; H03M 13/2792; H03M 13/1102; H03M 13/6552; H03M 13/116; H03M 13/2703; H03M 13/1185; H03M 13/616; H03M 13/1148; H03M 13/271; H03M 13/1105; H03M 13/152; H03M 13/2767; H03M 13/2906; H03M 13/253; H03M 13/09; H03M 13/1151; H03M 13/17; H03M 13/27; H03M 13/2707; H03M 13/2732; H03M 13/2739; H03M 13/6522; H03M 13/036; H03M 13/1128; H03M 13/098; H03M 13/356; H03M 13/6325; H03M 13/1111; H03M 13/1154; H03M 13/1515; H03M 13/156; H03M 13/256; H03M 13/2742; H03M 13/275; H03M 13/29; H03M 13/2903; H03M 13/2909; H03M 13/2918; H03M 13/2927; H03M 13/2933; H03M 13/2945; H03M 13/2948; H03M 13/2957; H03M 13/3746; H03M 13/41; H03M 13/4115; H03M 13/611; H03M 13/618; H03M 13/6312; H03M 13/6331; H03M 13/6519; H03M 13/6527; H03M 7/6041; G06F 11/1076; G06F 11/1004; G06F 11/1012; H04J 13/0003; H04J 13/12; H04J 13/18; H04J 11/004; H04J 13/102; H04J 14/04; H04J 14/06; G11B 2020/185; G11B 20/1806; G11B 20/1809; H04B 10/5161; H04B 10/541; H04B 10/2543; H04B 10/27; H04B 10/516; H04B 10/532; H04B 10/58; H04B 10/612; H04B 10/614; H04B 10/616; H04B 1/10; H04B 7/04; H04B 7/10; H04W 4/06; H04W 52/325; H04W 52/54; H04H 20/20; H04H 20/42; H04H 20/426; H04H 60/07; H04H 60/73; H04N 21/234309; H04N 21/236; H04N 21/43637; H04N 21/6131; H04N 5/63; Y02D 70/00; Y02D 70/166; Y02D 70/168
See application file for complete search history.

(56) References Cited

U.S. PATENT DOCUMENTS

2011/0276860 A1\* 11/2011 Lei .................. H04L 1/0041
714/776
2015/0372852 A1\* 12/2015 Delaruelle ............ H04L 1/0041
375/298

OTHER PUBLICATIONS

Giuseppe Caire, et al., Bit-Interleaved Coded Modulation, IEEE Transactions on Information Theory, May 1, 1998, pp. 927-945, vol. 44, No. 3, IEEE Press, USA.

\* cited by examiner

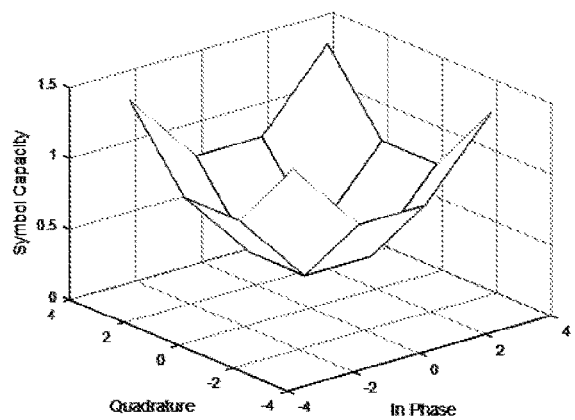
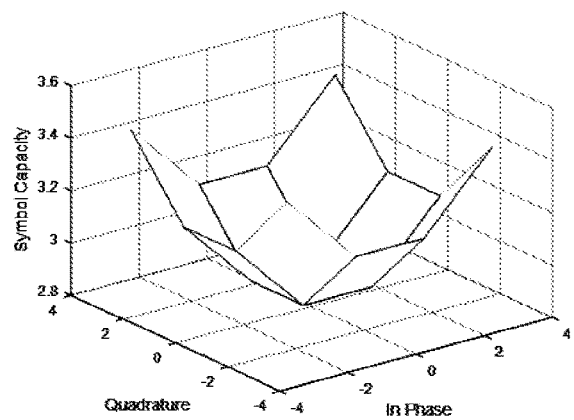
Figure 16
Figure 17
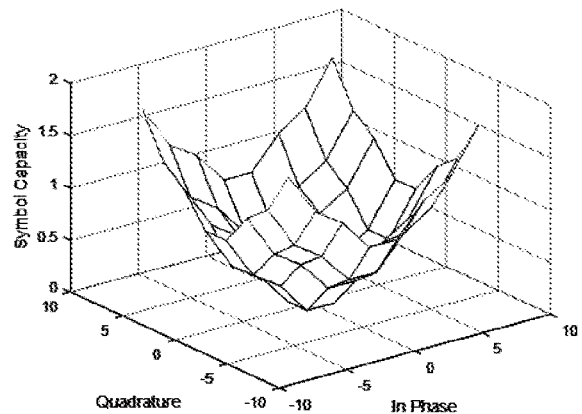
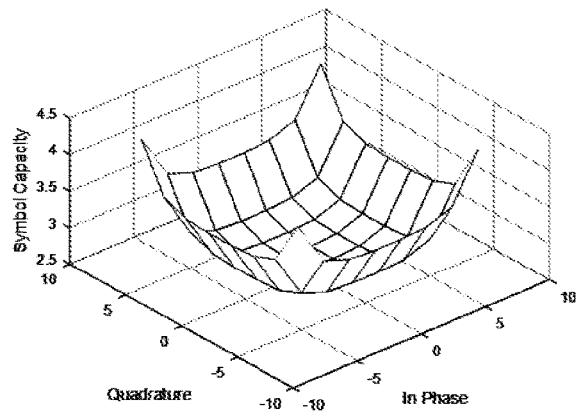
Figure 18
Figure 19
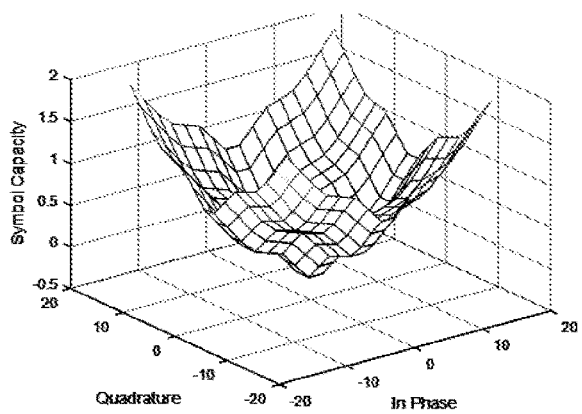
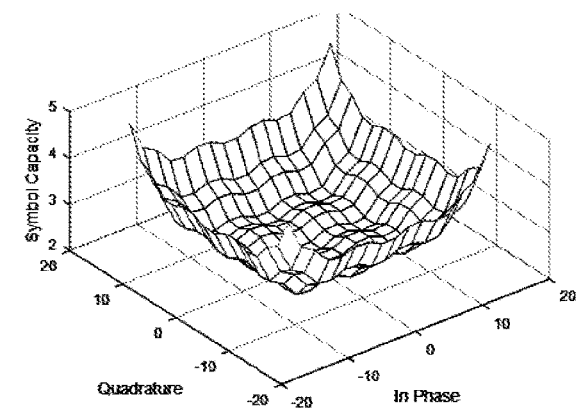
Figure 20
Figure 21

METHOD FOR BLOCK CAPACITY EQUALIZATION AND OPTIMIZATION

CROSS REFERENCES TO THE RELATED APPLICATIONS

This application is the national phase entry of International Application No. PCT/TR2017/050718, filed on Dec. 28, 2017, the entire contents of which are incorporated herein by reference.

TECHNICAL FIELD

The present disclosure relates a method equalizing the capacity of blocks, formed at a modulator site and show the amount of information reliably transmitted to a receiver, to increase performance and decrease wasted power of a communication system.

BACKGROUND

Modulation is used in almost every communication system. The average capacity of the particular modulation function is computed and the overall system is designed accordingly. The average modulation capacity is obtained for theoretically infinite length blocks, with the assumption that all symbols distributed equally likely.

The capacity of a block which is formed at the modulator site depends on the frequency of the modulation symbols that form the block. Therefore, depending on the modulation symbols that form the block, the block capacity (the amount of information that can reliably be transmitted by the block) is not constant but has a distribution around the average capacity. Therefore, some of the blocks have smaller capacity than the average capacity and some of the blocks have larger capacity than the average capacity. The blocks with small capacity have poor performance in terms of bit error ratio and block error ratio. On the other hand, the blocks with large capacity have larger power than the required, hence the excess power is wasted. In prior art, there is no technique to equalize the capacity of the blocks.

For short and medium length blocks, the capacity and the power distribution of the blocks can have a large variance depending on the modulation used or the channel conditions. Some symbols have even negative capacity for some signal to noise ratios. The large variance of the block capacity results in some blocks having smaller capacity and therefore their performance is worse. Likewise the blocks with excess capacity can have large block power and hence the power is wasted.

In prior art, the average capacity of a modulation (constellation) is computed. Since there is no technique to compute the individual symbol capacities of the constellation, the contribution of each symbol to the average capacity was unknown. With present invention, it is shown that the capacities of the modulation symbols vary greatly, and in some signal to noise ratios certain symbols have negative capacity.

Previous literature show no exact implementation of computing individual symbol and block capacity and equalizing it to the average or predetermined targeted block capacity.

SUMMARY

The invention relates to block capacity equalization that equalizes the capacity of the blocks by increasing the power of the blocks which have smaller capacity than the average capacity and decreases the power of the blocks which have larger capacity than the average capacity. The invention provides two main benefits; first, the performance of the blocks with small capacity is increased, second, the excess power of the blocks with large capacity is saved.

In the invention, the capacities of all modulation symbols and the bits forming that particular symbol are computed, while the average capacity of the modulation is computed in the prior art. This feature can be used to design new optimized constellations either for equally likely symbols or shaped constellations. At the modulator site, the block capacity is calculated from the symbol capacities and the distribution of the symbols that form the block. If the obtained block capacity is smaller than the average block capacity, its power is increased in necessary amount to equalize it to the average or targeted block capacity. If the block capacity is larger than the average block capacity, its power is decreased in necessary amount to equalize it to the average or targeted capacity.

Equalization of the block capacity at the modulator site provides a number of advantages as follows:

In the prior art, the BER (Bit Error Rate) and BLER (Block Error Rate) performance of a block depends on the distribution of the symbols and hence depends on the data. Block capacity equalization feature of the invention makes the performance independent of the data.

In the prior art, a block which is formed at the modulator site can have very low capacity and the probability of correctly decoding the block at the demodulator site is low. The invention increases the capacity of the block by increasing the power of the block in necessary amount so that the block is decoded at the receiver site correctly.

In the prior art, a block formed at the modulator site can have a larger capacity than the average capacity. The invention decreases the block power so that the extra power which is to be wasted with the prior art is saved.

In the prior art, the blocks collected at the receiver site can have a widely dispersed capacity hence the iteration count of the iterative receiver algorithms' (for example the LDPC or the Turbo decoder) have a large variance. Thanks to the invention, all blocks at the receiver have the same capacity and hence the variance of the iteration count is small and only depends on the noise.

For some modulation constellations, some bits of certain symbols can have negative capacity depending on the coded modulation technique used, i.e. Bit Interleaved Coded Modulation, with present invention these negative capacity bits can be determined and with an iterative demodulation technique can be erased to improve the performance. There is no comparable technique in the prior art.

BRIEF DESCRIPTION OF THE DRAWINGS

FIG. 16 and FIG. 17 show BICM symbol capacities of 16-QAM at SNR=0 dB and SNR=10 dB respectively.

FIG. 18 and FIG. 19 show BICM symbol capacities of 64-QAM at SNR=0 dB and SNR=10 dB respectively.

FIG. 20 and FIG. 21 show BICM symbol capacities of 256-QAM at SNR=0 dB and SNR=10 dB respectively.

DETAILED DESCRIPTION OF THE EMBODIMENTS

1. Symbol Capacity

The symbol capacity of any modulation is the amount of information carried when the symbol is transmitted over the channel. Then, it is shown that the capacity of a block depends on the distribution of the modulation symbols within that block. The proposed method is related with Block Capacity Equalization (BCE) which decreases the maximum transmit power of a block without any loss in performance (block error rate or bit error rate). The BCE technique working at the transmitter site increases the capacity of low capacity blocks by increasing the block power and decreases the power of the block which have excess capacity. BCE equalizes the capacity of all blocks to the average capacity and therefore performance is made independent of the distribution of the symbols within the block.

1.1 Symbol Capacity for Coded Modulation

Coded Modulation (CM) capacity is given by [1]

$$\hat{C} = I(X,Y) = m - E_{x,y}\left[\log_2 \frac{\sum_{z \in X} P(Y|z)}{P(Y|X)}\right] \quad (20)$$

which can be rewritten as:

$$\hat{C} = m - \sum_{i=0}^{M-1} \int p(x_i) p(y|x_i) \log_2 \frac{\sum_{s \in x} p(y|z)}{p(y|x_i)} dy \quad (21)$$

The CM symbol capacity as follows:

$$\hat{S}_i = m - \int P(y|x_i) \log_2 \frac{\sum_{s \in x} p(y|z)}{p(y|x_i)} dy \quad (22)$$

Then, the relation between the average CM Capacity and the symbol CM capacity can be shown to be:

$$\hat{C} = \frac{1}{M} \sum_{i=0}^{M-1} \hat{S}_i \quad (23)$$

In equation (4) the average CM capacity is the mean of the symbol capacities as expected, since each symbol is equally likely.

Figure 1:
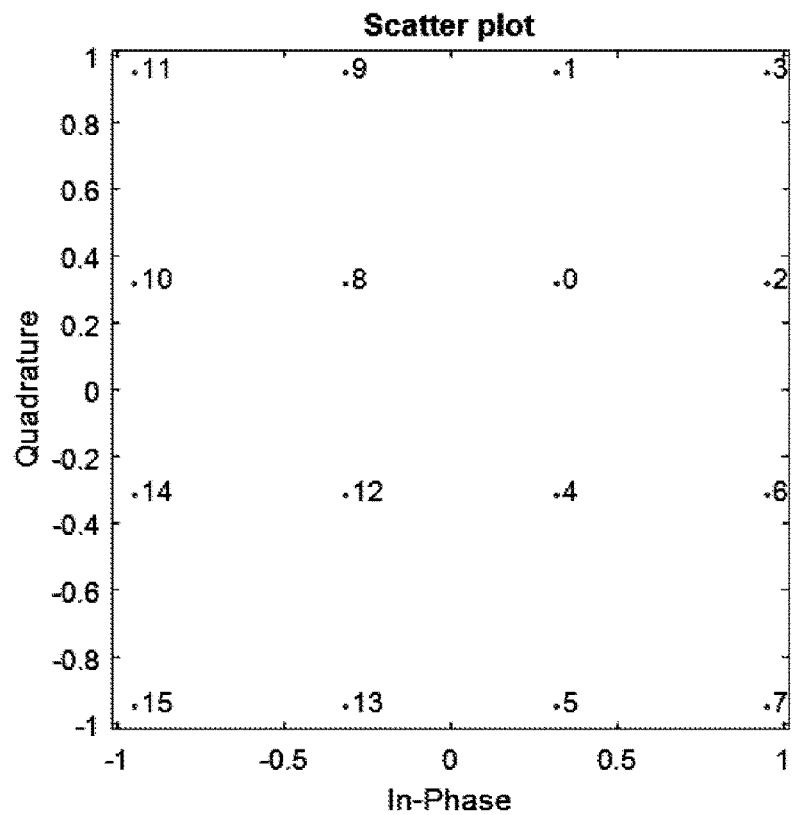
FIG. 1 shows LTE 16-QAM constellation.
Figure 2:
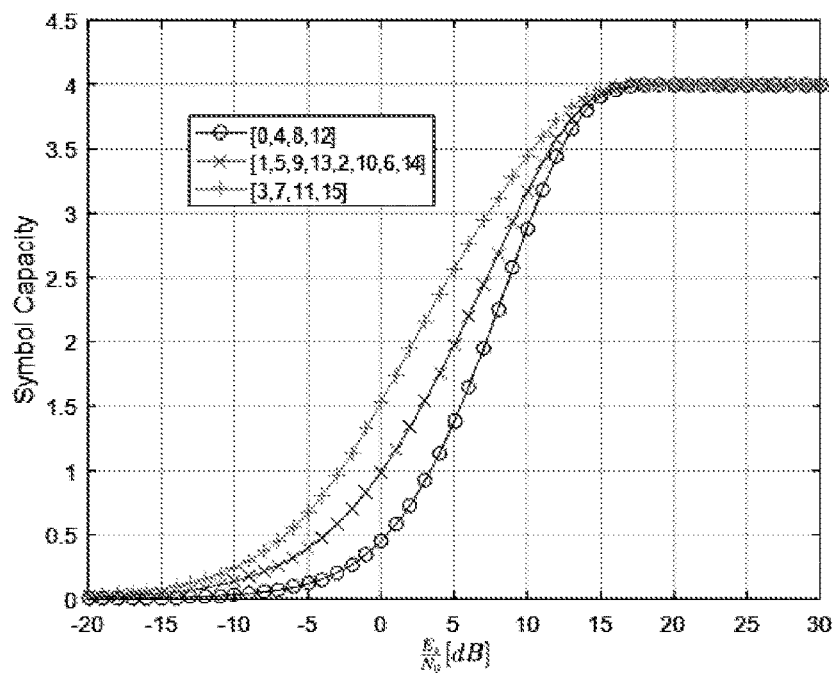
FIG. 2 shows CM symbol capacities of 16-QAM.

The CM symbol capacities of the 16-QAM (Quadrature Amplitude Modulation) constellation in FIG. 1 under AWGN (Additive White Gaussian Noise) channel is given in FIG. 2. The inner points [0, 4, 8, 12] have the smallest capacity while the corner points [3, 7, 11, 15] have the largest capacity.

Figure 3:
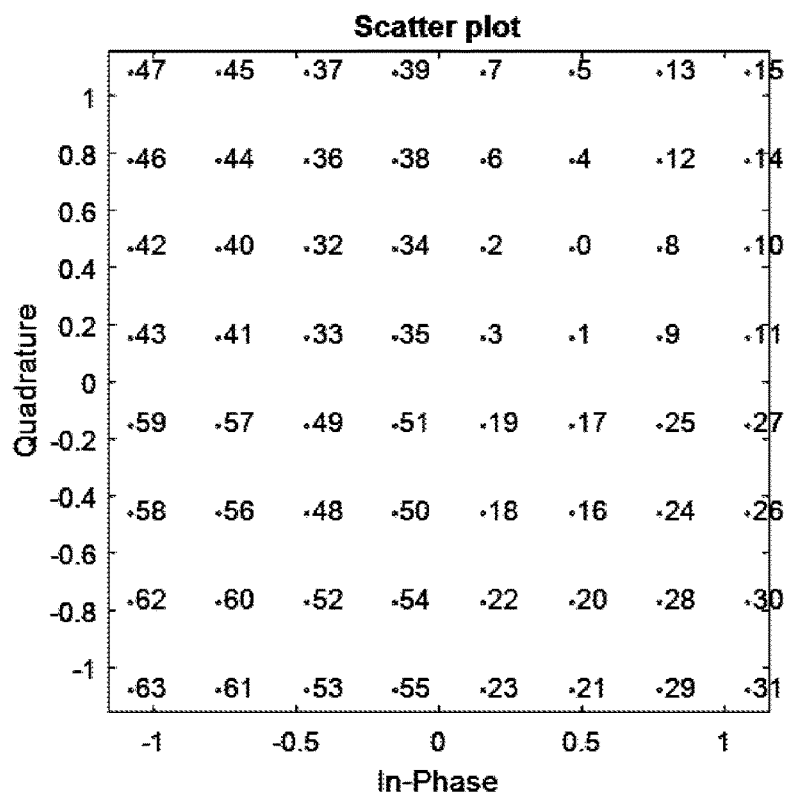
FIG. 3 shows LTE 64-QAM constellation.
Figure 4:
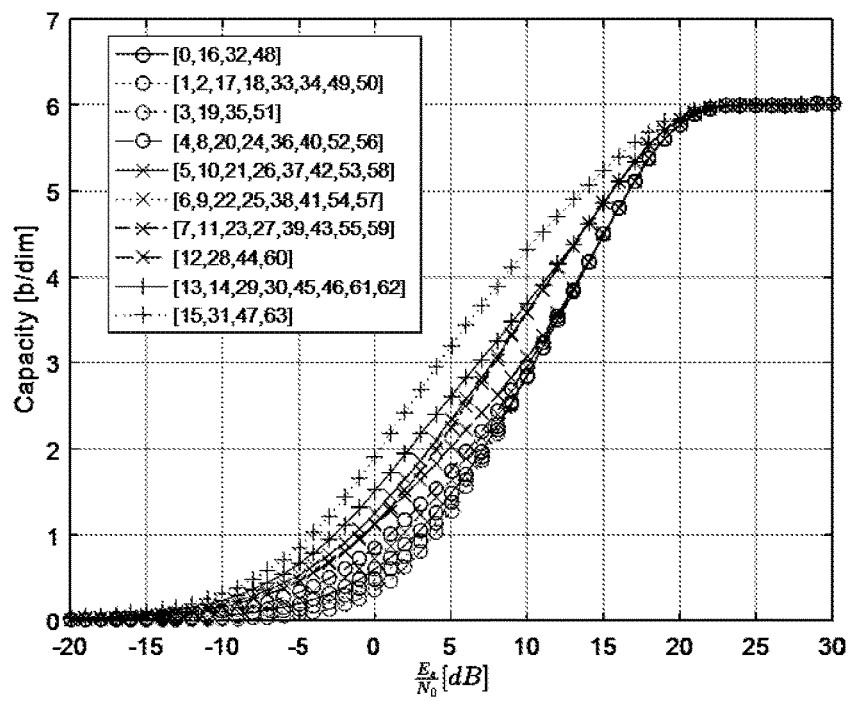
FIG. 4 shows CM symbol capacities of 64-QAM modulation.
Figure 5:
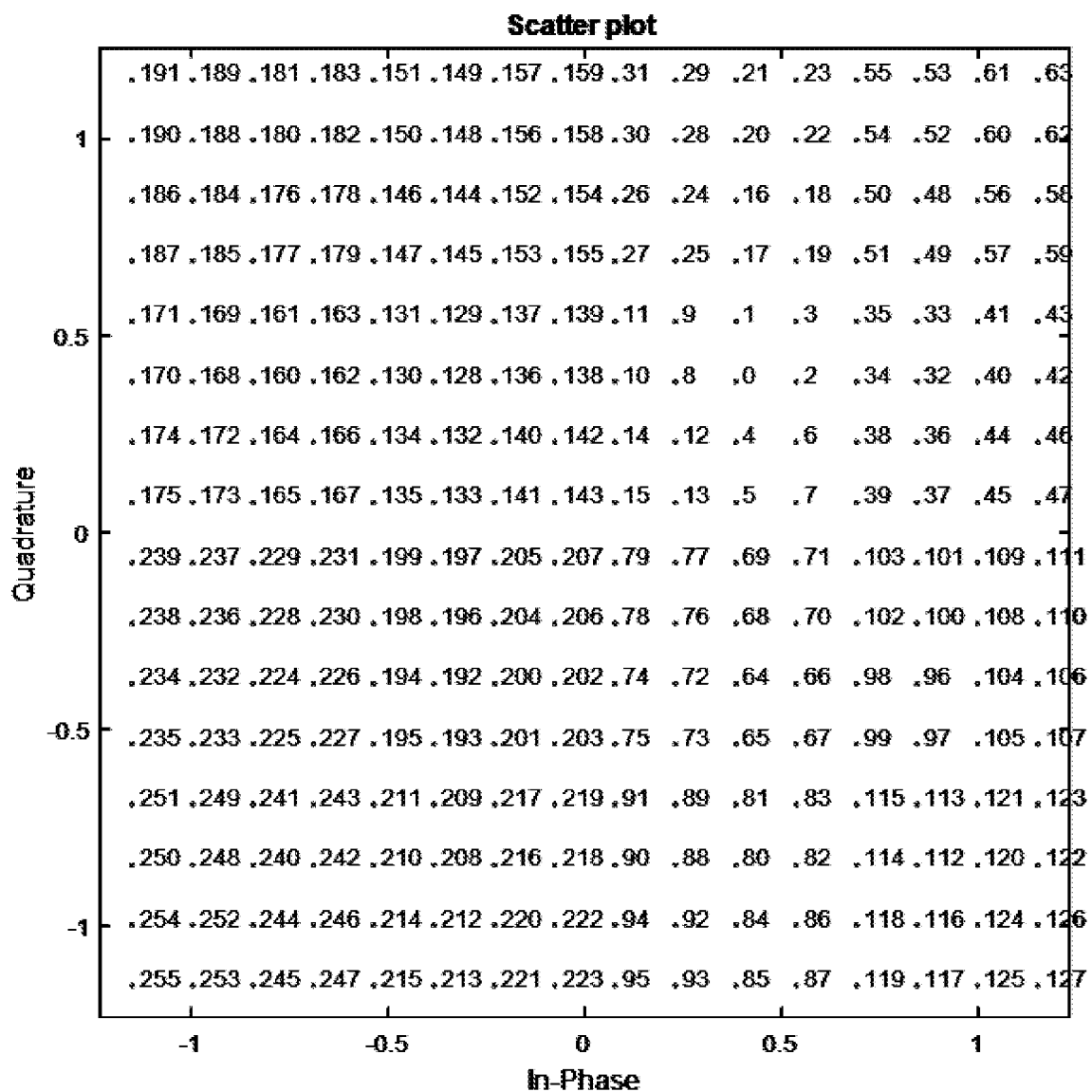
FIG. 5 shows 256-QAM constellation.
Figure 6:
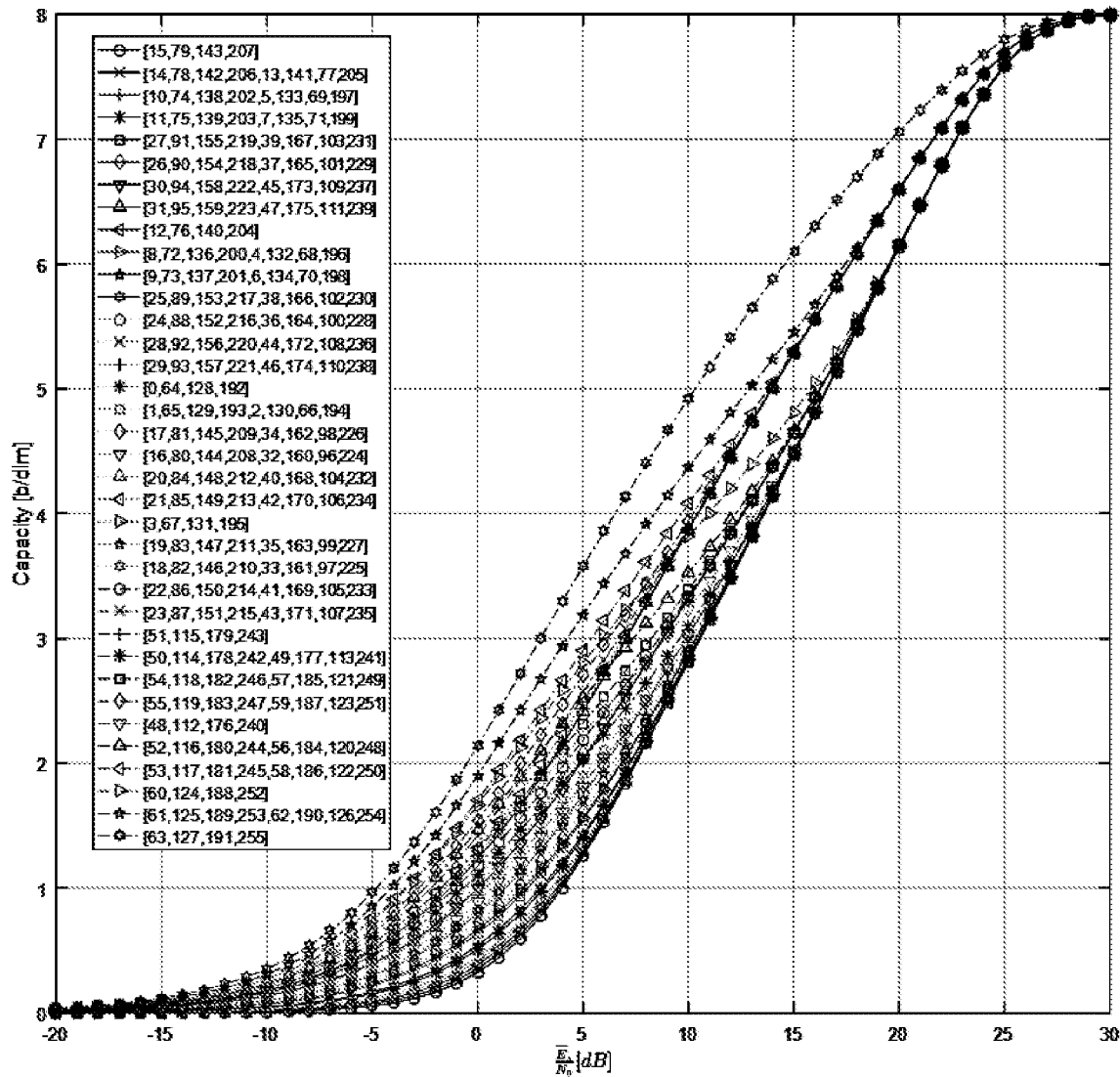
FIG. 6 shows CM symbol capacities of 256-QAM constellation.
Figure 7:
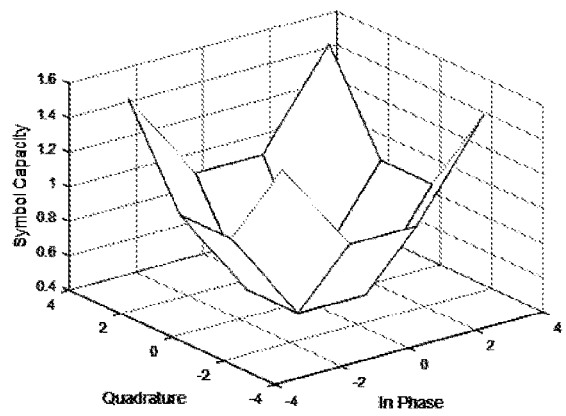
FIG. 7 and FIG. 8 show CM symbol capacities of 16-QAM at SNR=0 dB and SNR=10 dB respectively.
Figure 8:
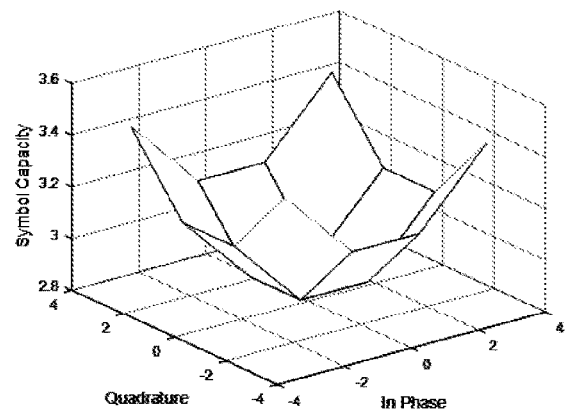
Figure 9:
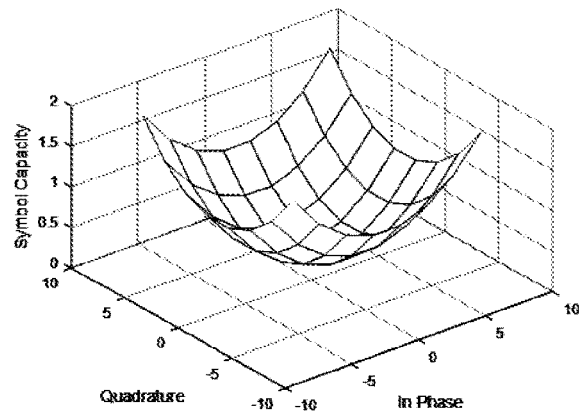
FIG. 9 and FIG. 10 show CM symbol capacities of 64-QAM at SNR=0 dB and SNR=10 dB respectively.
Figure 10:
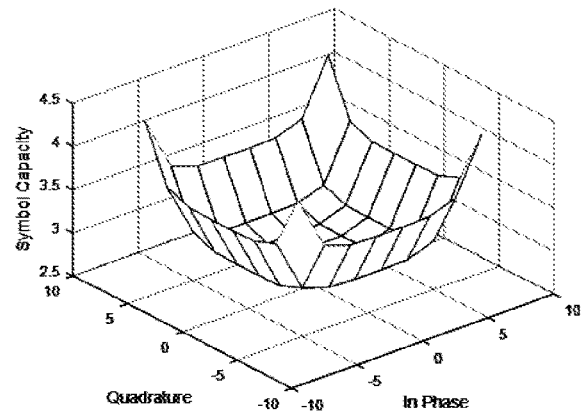
Figure 11:
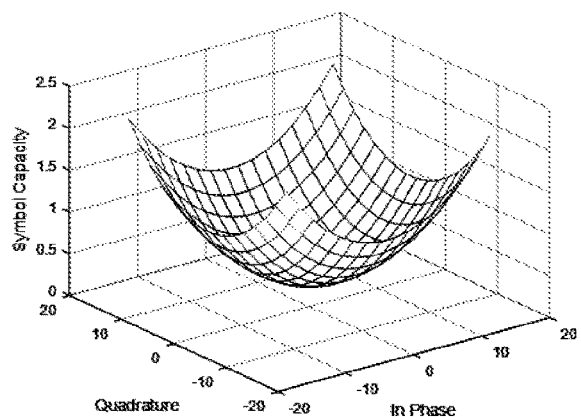
FIG. 11 and FIG. 12 show CM symbol capacities of 256-QAM at SNR=0 dB and SNR=10 dB respectively.
Figure 12:
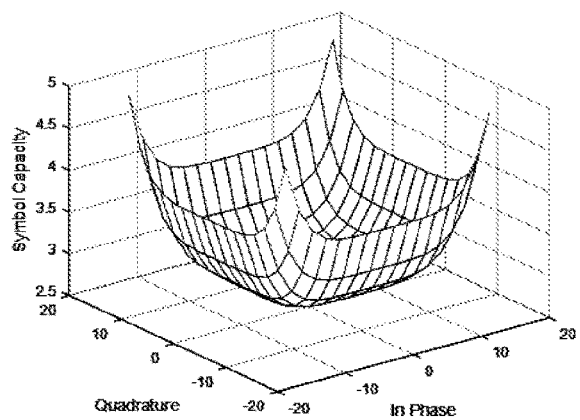

Likewise, the CM symbol capacities of 64-QAM constellation in FIG. 3 and 256-QAM constellation in FIG. 5 under AWGN channel are depicted in FIG. 4 and FIG. 6 respectively.

One can easily prove that for a rectangular M-QAM constellation there will be $$\binom{\sqrt{M}/2}{2} + \frac{\sqrt{M}}{2}$$

many different distinct CM symbol capacity curves.

FIG. 7 through FIG. 12 shows the symbol capacities for 16-QAM, 64-QAM and 256-QAM modulations for two SNR (Signal-to-Noise Ration) values 0 dB and 10 dB. The xy plane in the figures corresponds to the constellation points and the z-axis is the CM symbol capacity.

1.2 Symbol Capacity for BICM

Bit Interleaved Coded Modulation (BICM) capacity is given by [1]

$$\tilde{C} = \sum_{j=1}^{m} \tilde{C}^j \quad (24)$$

where $\tilde{C}^j$ denotes the capacity of the $j^{th}$ bit of the QAM symbols, and it can be written as follows:

$$\tilde{C}^j = I(b^j; Y) = 1 - \sum_{b^j \in (0,1)} \int_{-\infty}^{\infty} P(y, b_j) \log_2 \left(\frac{\sum_{z \in X} p(y|z)}{\sum_{x \in X_{b^j}} p(y|x)}\right) dy \quad (25)$$

In equation (6), $\chi_{b^j}$ represents all symbols whose $j^{th}$ bit has the value of $b_j$. Equation (6) can be written as follows:

$$I(b^j; Y) = 1 - \sum_{s \in \chi} \int_{-\infty}^{\infty} P(y|s)P(s)\log_2\left(\frac{\sum_{z \in \chi} p(y|z)}{\sum_{x \in \chi_{b^j=s^j}} p(y|x)}\right) dy \quad (26)$$

In equation (7), $\chi_{b^j=s^j}$ represents all symbols whose $j^{th}$ bit has the value of $j^{th}$ bit of the symbol s. The bit-symbol capacity which is the capacity of the $j^{th}$ bit of the $i^{th}$ symbol as follows:

$$\tilde{S}_i^j = 1 - \int_{-\infty}^{\infty} P(y|s_i)\log_2\left(\frac{\sum_{z \in \chi} p(y|z)}{\sum_{x \in \chi_{b^j=s_i^j}} p(y|x)}\right) dy \quad (27)$$

It can be shown that the average capacity of the $j^{th}$ bit is as follows:

$$\tilde{C}^j = I(b^j; Y) = \frac{1}{M}\sum_{i=0}^{M-1} \tilde{S}_i^j \quad (28)$$

And the symbol capacity of the $i^{th}$ symbol can be written as follows:

$$\tilde{S}_i = \sum_{j=0}^{m-1} \tilde{S}_i^j \quad (29)$$

Figure 13:
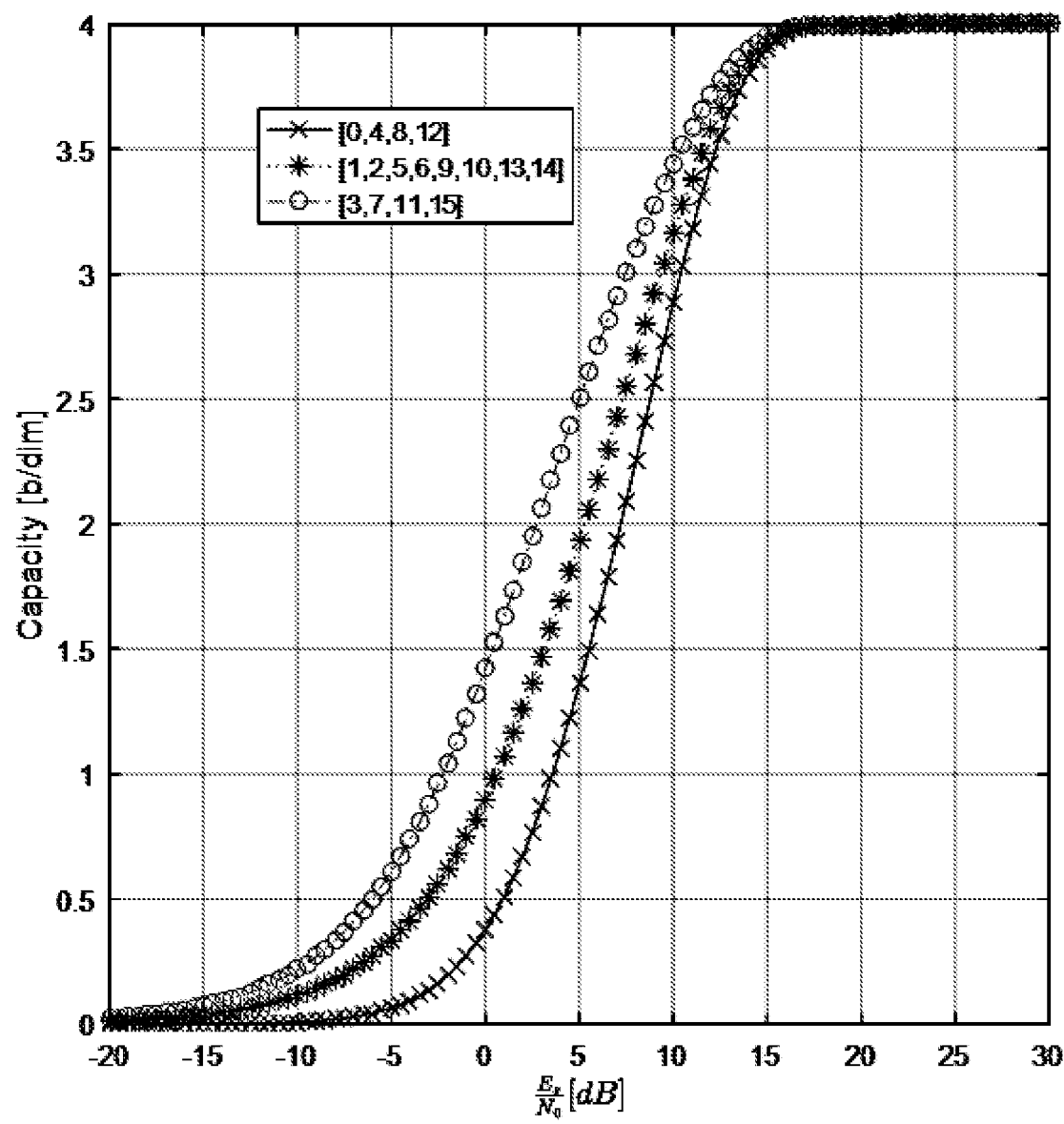
FIG. 13, FIG. 14 and FIG. 15 show BICM symbol capacities of 16-QAM, 64-QAM and 256-QAM respectively.

It must be noted that while the bit capacity which is given in equation (9) is a mutual information term, the BICM symbol capacity in equation (10) is not. The BICM symbol capacities of the constellations in FIG. 1, FIG. 3 and FIG. 5 are illustrated in FIG. 13, FIG. 14 and FIG. 15.

Figure 14:
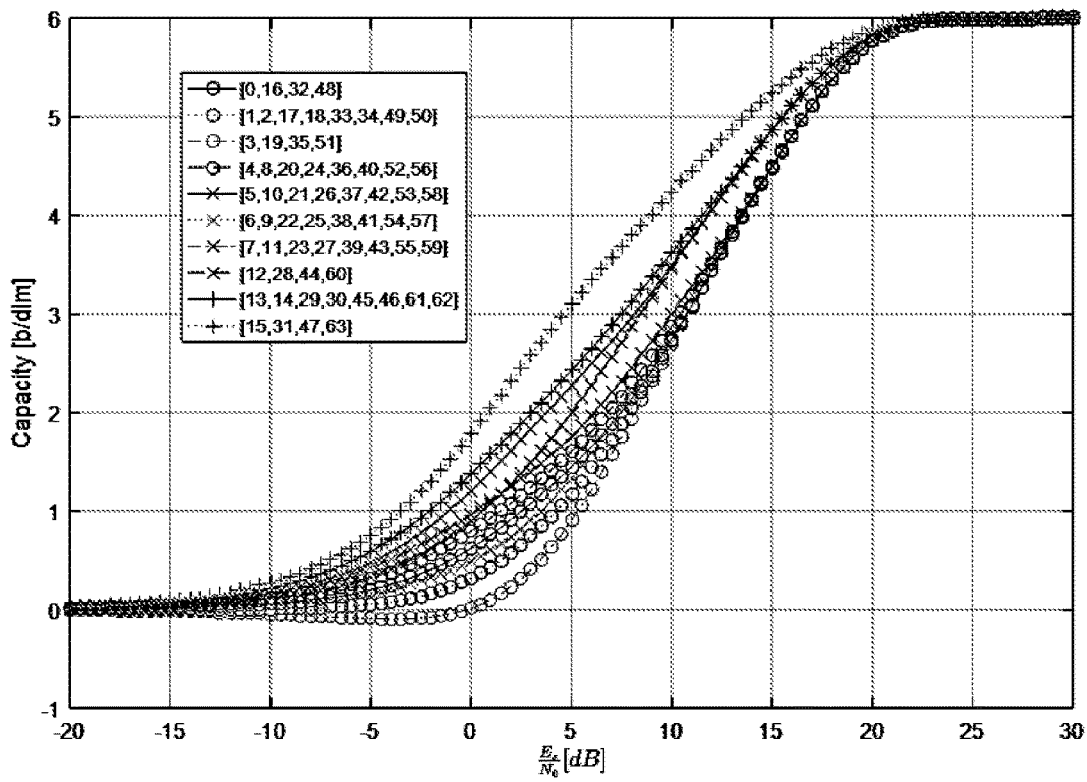
Figure 15:
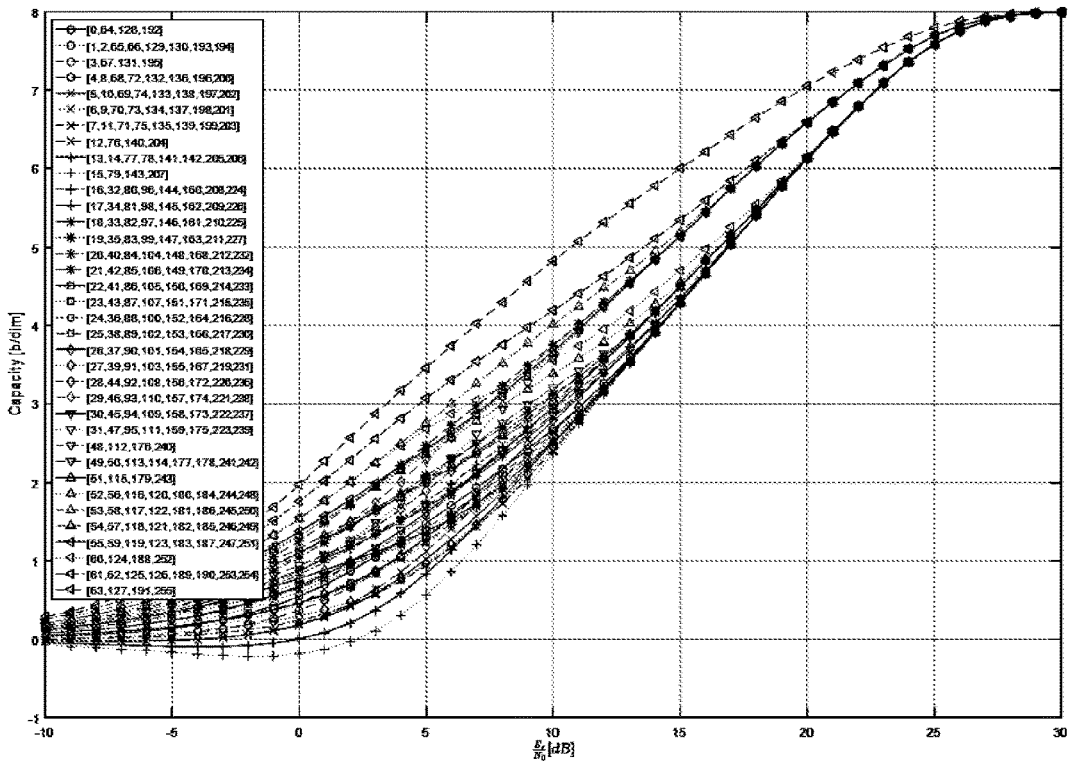

As illustrated in FIG. 14, the innermost symbols [3, 19, 35, 51] of the 64 QAM constellation (FIG. 3) have negative symbol capacity for some SNR values. For 256 QAM constellation not only the innermost symbols [15, 79, 143, 207] but also the symbols [13, 14, 77, 78, 141, 142, 205, 206] which are on the second innermost ring have negative symbol capacities for some SNR values.

FIG. 16 through FIG. 21 shows the BICM symbol capacities for 16-QAM, 64-QAM and 256-QAM modulations for two SNR values 0 dB and 10 dB. The xy plane in the figures corresponds to the constellation points and the z-axis is the BICM symbol capacity.

2. Block Capacity

A block can be defined as a sequence of modulation symbols. The capacity of a block which is composed of L modulation symbols can be written as:

$$B = \sum_{i=0}^{M-1} f_i S_i \quad (30)$$

In equation (11), $f_i$ is the frequency of the $i^{th}$ symbol in the block, i.e, the ratio of the number of occurrences of the $i^{th}$ symbol to the total number of symbols in the block. $S_i$ can be set to $\hat{S}_i$ or $\overline{S}_i$ for CM and BICM schemes respectively.

Here, it is assumed that the receiver has no knowledge about $f_i$ and processes the symbols as if $f_i=1/M$, i.e. each symbol is equally likely.

Figure 22:
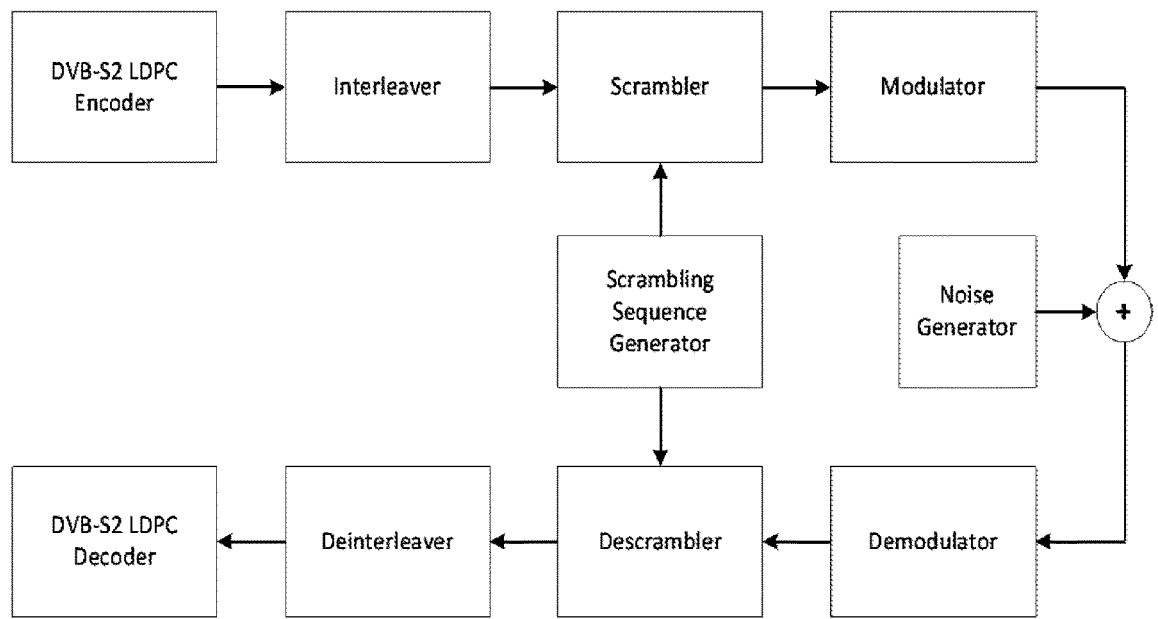
FIG. 22 shows block capacity simulation setup.

In order to justify the concept of block capacity, 12 blocks, each of which having different symbol distributions and hence different capacity, are simulated with DVB-S2 (Second generation Digital Video Broadcasting standard) LDPC (Low Density Parity Check) code. The simulation setup is illustrated in FIG. 22. The code rate of the DVB-S2 LDPC encoder is R=½. The input bit stream to the encoder is the all zero sequence for all simulations. Since the LDPC code is linear, the output of the encoder and the output of the interleaver is all zero bit sequence. The interleaver is randomly generated for once and the same interleaver is used for all simulations. Since the input to the scrambler module is all zero bit sequence, the scrambler sequence determines the symbol distributions. 12 different scrambling sequences are used. The scrambling sequences are so selected that the output of the modulator has only the three symbols 0, 2 and 3 (FIG. 1). The distributions of the symbols for the 12 blocks are shown in Table 1 (columns 2, 3 and 4). The noise generator module adds Gaussian noise to the incoming symbols. It must be noted that the noise generator block does not measure the distribution of the incoming symbols, it adds noise according to average constellation power. The average constellation power, i.e., $E_S=1$.

TABLE 1

Block capacity simulation parameters and performance results

| Block No | $n_0$ | $n_2$ | $n_3$ | $\frac{E_s}{N_0}$ (dB) where $B^i = 2$ bit/dim | $\frac{E_s}{N_0}$ (dB) at BLER = $10^{-1}$ | Performance Gap to Block Capacity | Block Power in dB |
|---|---|---|---|---|---|---|---|
| 1 | 16200 | 0 | 0 | 7.1977 | 7.7493 | 0.5516 | −6.9897 |
| 2 | 14000 | 1100 | 1100 | 6.8690 | 7.4481 | 0.5791 | −4.4014 |
| 3 | 12000 | 2100 | 2100 | 6.5436 | 7.1532 | 0.6096 | −2.9148 |
| 4 | 10000 | 3100 | 3100 | 6.1917 | 6.8258 | 0.6341 | −1.8094 |
| 5 | 8000 | 4100 | 4100 | 5.8128 | 6.4668 | 0.6540 | −0.9291 |
| 6 | 6000 | 5100 | 5100 | 5.4072 | 6.0771 | 0.6699 | −0.1974 |
| 7 | 4000 | 6100 | 6100 | 4.9760 | 5.6602 | 0.6842 | 0.4285 |
| 8 | 2000 | 7100 | 7100 | 4.5213 | 5.2086 | 0.6873 | 0.9755 |
| 9 | 0 | 8100 | 8100 | 4.0468 | 4.7252 | 0.6784 | 1.4613 |
| 10 | 0 | 5000 | 11200 | 3.5408 | 4.2095 | 0.6687 | 1.9120 |
| 11 | 0 | 2500 | 13700 | 3.1258 | 3.7874 | 0.6616 | 2.2441 |
| 12 | 0 | 0 | 16200 | 2.7091 | 3.3663 | 0.6572 | 2.5527 |

Therefore care must be taken to interpret the meaning of $E_S/N_0$. It is the average constellation power (not the block power) to noise ratio. The demodulator block computes the logarithmic likelihood ratios (LLRs) and the scrambler block simply inverts the sign of the LLRs when the corresponding bit in the scrambler sequence is '1'.

Figure 23:
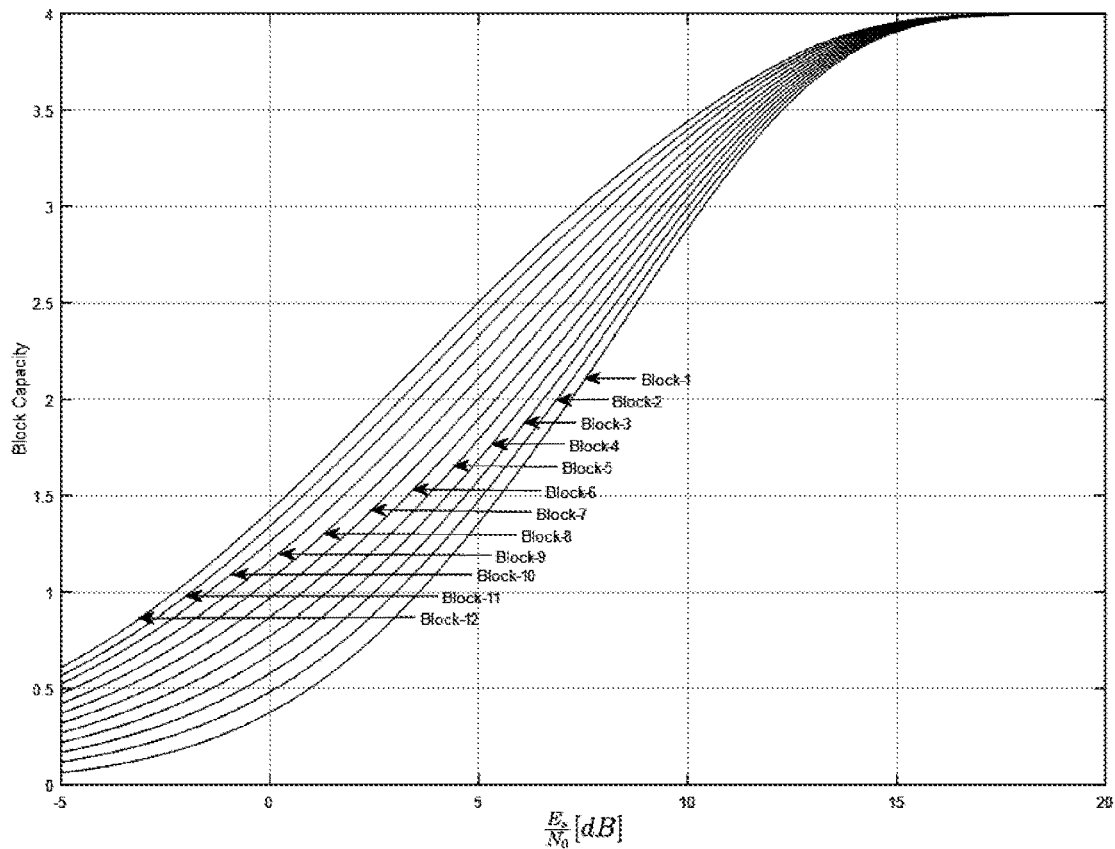
FIG. 23 shows block capacities of 12 blocks.

By using Equations (8, 10, 11), the capacities of the 12 blocks can be computed and are illustrated in FIG. 23. As can be seen from the figure, block-12 has the largest capacity since it is composed of the symbol $x_3$ which has the largest symbol capacity and block-1 has the smallest capacity since it is composed of $x_0$ which has the smallest symbol capacity. The fifth column in Table 1 shows the $E_S/N_0$ value for which 2-bit spectral efficiency is achieved. Block-12 achieves 2 bit spectral efficiency at $E_S/N_0=2.7091$ dB whereas block-1 achieves at 7.7493 dB.

The last column in Table 1 shows the power of the blocks which are calculated simply as:

$$W = \sum_{i=0}^{M-1} |x_i|^2 f_i \quad (31)$$

The block power of block-12 is largest and 2.5527 dB above the average constellation power, while the block power of block-1 is −6.9897 dB.

2.1 Negative Symbol Capacities

As it is already mentioned under the title of Symbol Capacity for BICM, symbol capacity can be negative, i.e., $S_i<0$. If $S_i<0$ then it is clear that $S_i^j<0$ for some j's. Moreover, even if the symbol capacity is positive, some of the bit-symbol capacities can be negative, i.e. $S_i^j<0$ for some $S_i>0$. For a BICM receiver, if the locations of the bits which have negative bit-symbol capacity is known, the performance of the decoder can be improved by just erasing the corresponding bit, i.e., the log likelihood ratio is set to 0. We will call this technique as Genie Aided Erasure (GAE).

Figure 24:
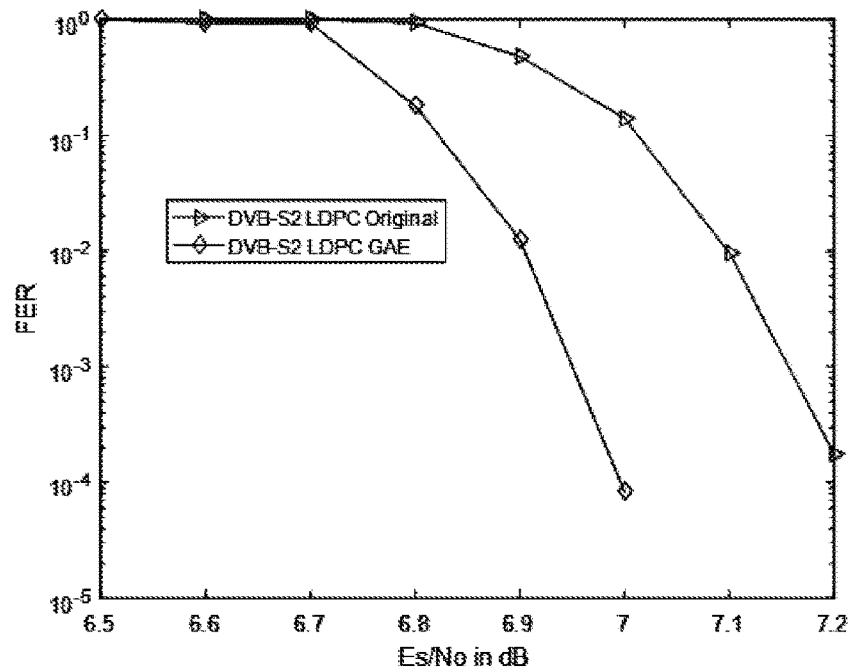
FIG. 24 shows the GAE performance.

FIG. 24 compares the performance of GAE with that of original. For both simulations the parameters in Table 2 are used. As can be seen from the figure, erasing the bits which have negative capacity improves the FER (Frame Error Rate) performance.

TABLE 2

Parameters for GAE performance simulation

| Code Rate | ¼ |
| --- | --- |
| Modulation | 256-QAM |
| Block Length | 64800 |
| Max Iterations | 1000 |
| Demodulation Technique | Log-MAP |
| Decoder Algorithm | Sum-Product |
| BICM Interleaver | Yes |

2.2 Block Capacity Distributions for 16-QAM

As illustrated in FIG. 13, the individual symbol capacities of 16-QAM constellation are split into three groups. Symbols [0, 4, 8, 12] which are the inner points have the smallest capacity, symbols [3, 7, 11, 15] which are the corner points have the largest capacity, and the remaining symbols which are on the periphery have the medium capacity. The capacities of these three groups will be represented as $C_{g_1}$, $C_{g_2}$, $C_{g_3}$, where $g_1=\{0,4,8,12\}$
$g_2=\{1,2,5,6,9,10,13,14\}$
$g_3=\{3,7,11,15\}$ Assuming each symbol is equally likely, probabilities of drawing a symbol from these capacity groups are as follows:

$$p_{g_1} = \frac{1}{4}, p_{g_2} = \frac{1}{2}, p_{g_3} = \frac{1}{4}$$

and the energy of the symbol groups, assuming the average energy of the constellation is normalized to 1, are as follows:

$W_{g_1}=0.2, W_{g_2}=1, W_{g_3}=1.8$

Assuming each QAM symbol is equally likely, the probability of a block of length L symbols having $n_1$ symbols from the set $g_1$, $n_2$ symbols from the set $g_2$ and $n_3$ symbols from the set $g_3$ is given by the well-known multinomial distribution:

$$P(n_1, n_2, n_3, L) = \frac{L!}{n_1! n_2! n_3!} p_{g_1}^{n_1} p_{g_2}^{n_2} p_{g_3}^{n_3} \quad (32)$$

Clearly the sum of the number of the symbols from each group is equal to L:

$$n_1+n_2+n_3=L \quad (33)$$

the corresponding block capacity is:

$$B(n_1, n_2, n_3) = \frac{n_1}{L}C_{g_1} + \frac{n_2}{L}C_{g_2} + \frac{n_3}{L}C_{g_3} \quad (34)$$

and the block power is:

$$W(n_1, n_2, n_3) = \frac{n_1}{L}W_{g_1} + \frac{n_2}{L}W_{g_2} + \frac{n_3}{L}W_{g_3} \quad (34)$$

Figure 25:
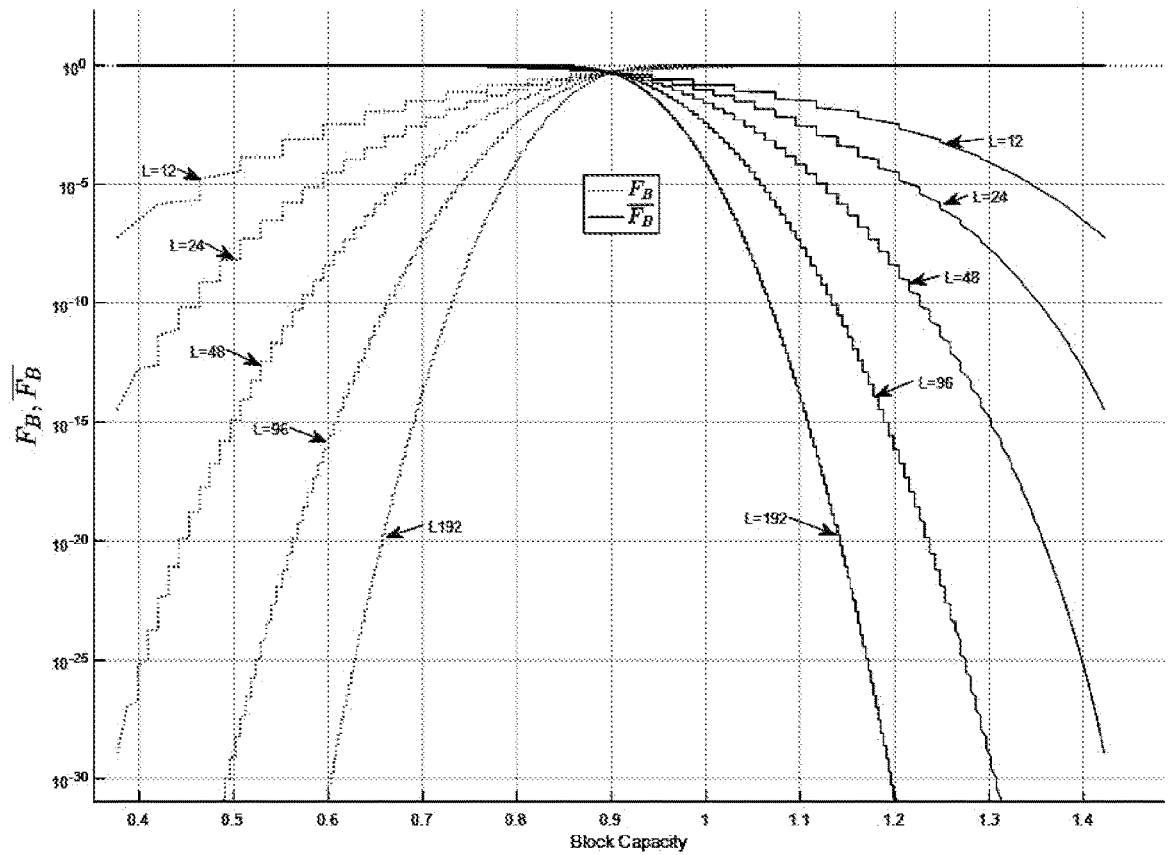
FIG. 25 shows block capacity distributions for L=12, 24, 48, 96 and 192 symbols for 16-QAM, BICM scheme at SNR=0 dB.
Figure 26:
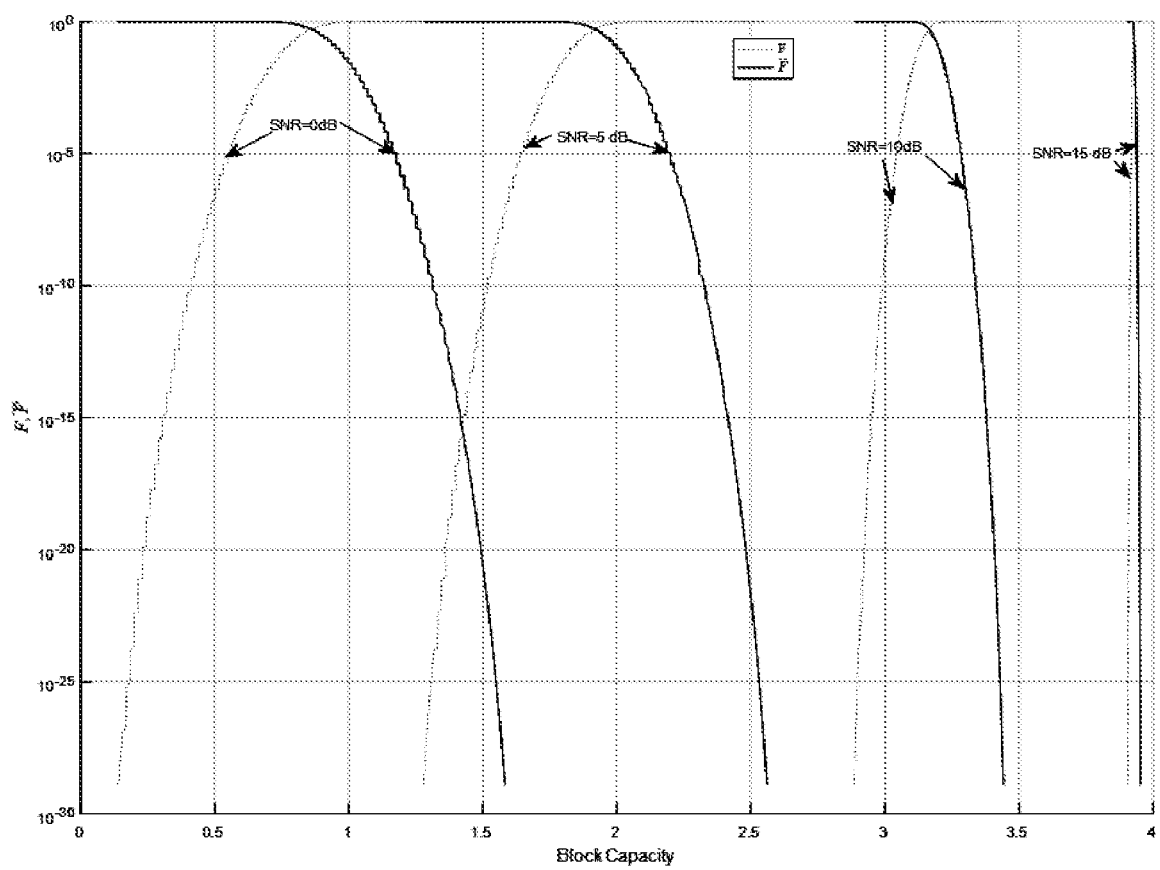
FIG. 26 shows block capacity distributions for L=48 and SNR=0, 5, 10 and 15 dB for 16-QAM, BICM Max-Log-MAP.

By using equations (13, 15, 16), block capacity and block power distributions can be obtained. FIG. 25 shows the block capacity distributions for block lengths L=12, 24, 48, 96 and 192 for 16-QAM modulation and BICM scheme. In the figure, $F_C$ represents the cumulative distribution function and $\overline{F_C}$ represents the complementary cumulative distribution function. As it is clear from the figure as the block length is increased the block capacity gets converges toward the average block capacity. FIG. 26 shows the block capacity distributions for the block having L=48 symbols for SNR values of 0, 5, 10 and 15 dB. At high SNR values, the block capacity distribution is narrower around the average block capacity. This can be readily seen from FIG. 1, for SNR=15 dB the symbol capacities of the three symbol groups are very close, therefore the distribution has a small variance around the average block capacity.

Figure 27:
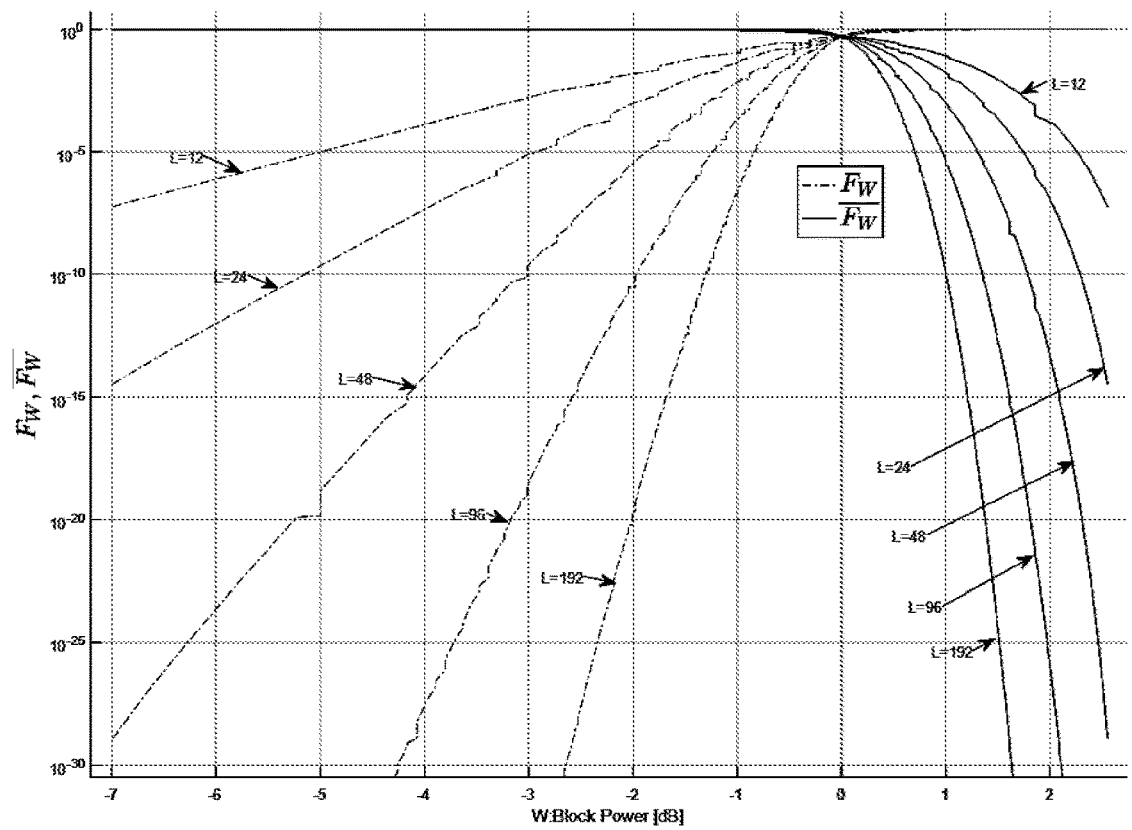
FIG. 27 shows block power distributions for L=12, 24, 48, 96 and 192 symbols for 16-QAM and BICM scheme.

FIG. 27 shows the block power distributions for block lengths L=12, 24, 48, 96 and 192 symbols. As L increases, the block power distribution converges toward to the average block power (0 dB).

3. Block Capacity Equalization by Block Power Scaling

In almost all communication systems, the digital information at the input of the channel encoder has an entropy of 1, i.e. the probabilities of 1's and 0's are equal. Moreover, in order to avoid long sequences of 0's and/or 1's a scrambler is used. Therefore, almost all practical BICM receivers, assumes a priori distributions of 1's and 0's as ½. Since the binary information at input of the encoder has an entropy of 1, it is expected that the symbols at the modulator output is uniformly distributed. However, for a single realization of the block, the number of modulation symbols are not equal and hence the capacity of the block may be different from the average BICM capacity, and has a distribution around the average BICM capacity. The width of the distribution, i.e. the variance of the distribution becomes larger when the block length gets smaller. Block capacities can be equalized at the transmitter site by scaling the block power to the amount necessary to obtain the average BICM capacity. Block capacity is a function of both the signal-to-noise ratio, γ and the frequency of the symbols f, i.e., B(γ, f). The frequency of symbols is given by:

$f=[f_0,f_1, \ldots, f_{M-1}]$ where $M=|\chi|$

The average block capacity (i.e. BICM Capacity) is obtained when the frequency of the symbols are all equal:

$$f_i = \frac{n_i}{L} = \frac{1}{M} \text{ for } i = 0, 1, \ldots, M-1$$

The average block capacity will be represented as $\overline{B}(\gamma)$, the dependence on f is dropped since it is known. At a given (or targeted) signal to noise ratio, any block's capacity can be equalized to the average block capacity by scaling the block power at the transmitter:

$$B(\gamma_{BCE},f) = B(\alpha\gamma_{target},f) = \overline{B}(\gamma_{target}) \quad (36)$$

$$\gamma_{BCE} = B^{-1}(\overline{B}(\gamma_{target})) \quad (37)$$

$$\alpha = \frac{\gamma_{BCE}}{\gamma_{target}} \quad (38)$$

Figure 28:
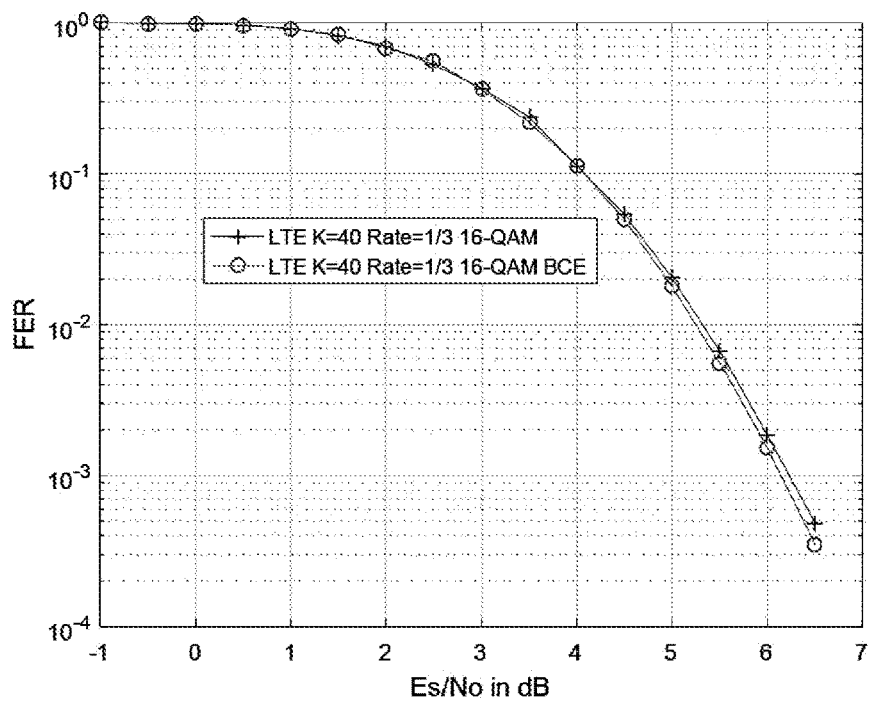
FIG. 28 shows performance comparison of BCE and non-BCE (classical).

FIG. 28 shows the performances of BCE and the classical technique for LTE Turbo Code. The simulation parameters are as follows: information block length K=40, code rate R=⅓, maximum number of iterations is 10, the number of frame errors collected at each SNR point is 1000. As can be seen from the figure, no performance difference is observed. BCE increases the capacity of the low capacity blocks by increasing the transmitted power and decreases the capacity of the high capacity blocks by decreasing the block power. Statistically, the same performance is expected since the average capacity of the two techniques are the same (over several number of blocks). However, the advantage of BCE is that, when a block is formed at the transmitter its individual performance can be measured and if it is a low capacity block, i.e. the probability of transmitting that frame over the channel without the error is small, transmit power is increased. The other way around, if the block capacity is larger than the average block capacity, the excess power can be reduced. In short, BCE normalizes the performance of each block at the transmitter, hence makes the performance data independent.

Figure 29:
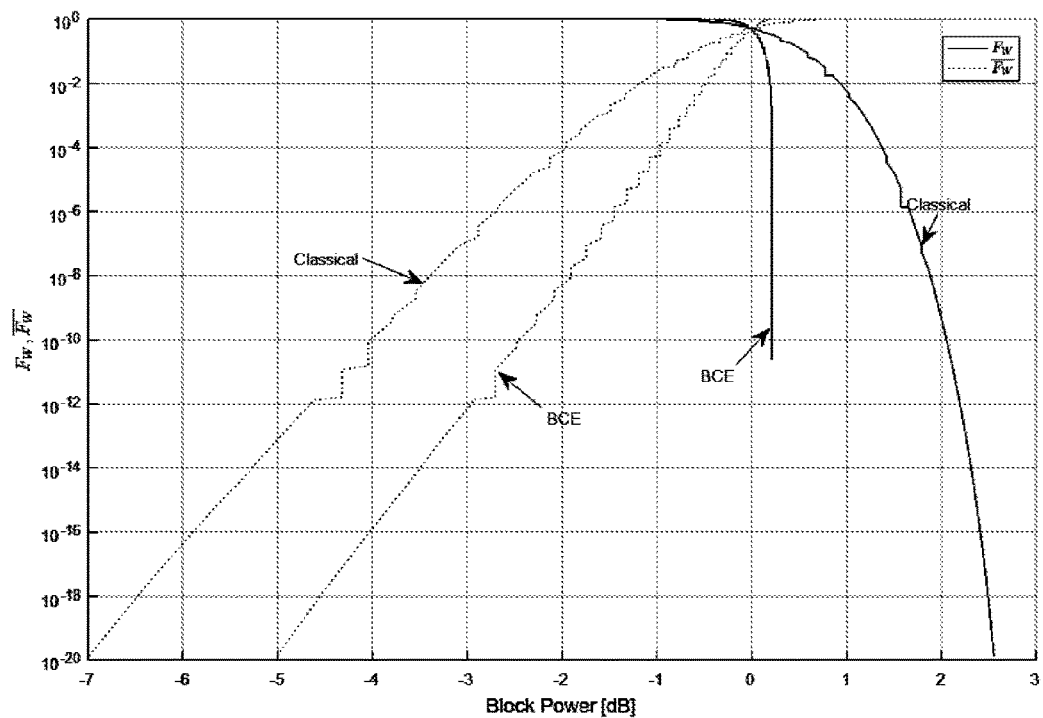
FIG. 29 shows CCDF of frame average power for BCE and classical.

FIG. 29 shows the CCDF (Complementary Cumulative Distribution Function) of the classical and BCE techniques for frame length L=33, which corresponds to the simulation whose results are given in FIG. 28. As can be seen from the figure, BCE limits the maximum block power to 0.21 dB. However, the maximum block power of the classical technique can be as large as 2.55 dB. The maximum block power is obtained when all the QAM symbols are from corner points. Although this is an extremely rare condition ($10^{-20}$), there is still a substantial gain for $\overline{F}_W = 10^{-4}$ which is 1.16 dB.

In an OFDM (Orthogonal Frequency Division Multiplexing) system, the peak power (in dB) at the output of the inverse FFT module is simply the average power of the signal (either at the input or at the output of the IFFT) plus the peak-to-average power of the signal at the output of the IFFT block. Since BCE decreases the average power of the block which is input to the IFFT, the peak output power is decreased by the same amount. Hence the gain from BCE can be added directly to the system performance.

For a targeted CCDF value, the gain and the benefit of the BCE decreases as the block length increases, since the block capacity approaches asymptotically to the average block capacity. In many of the communications standards however, such as LTE and Wi-Fi, the code block is split into a number of OFDM symbols. BCE can be used for the sub-block assigned to each OFDM symbol individually. For example, the 20 MHz channel Wi-Fi OFDM symbol has 48 data subcarriers and 4 pilot subcarriers. The LDPC coded block can span more than one OFDM symbol. The BCE technique can be applied to each OFDM symbol individually. The constellation scaling coefficient, $\alpha$ is used to scale the pilot signals as well in order for the receiver to determine the constellation correctly.

Figure 30:
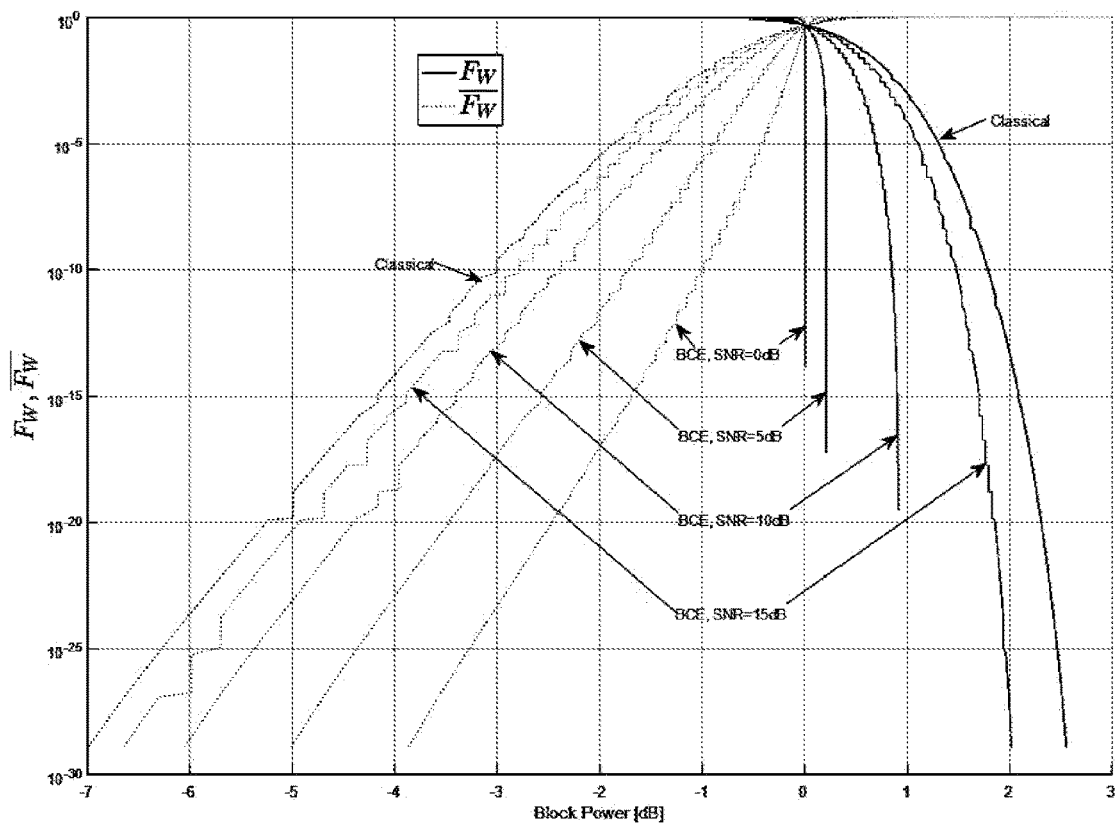
FIG. 30 shows block power distributions for L=48 at SNR=0, 5, 10 and 15 dB.
Figure 31:
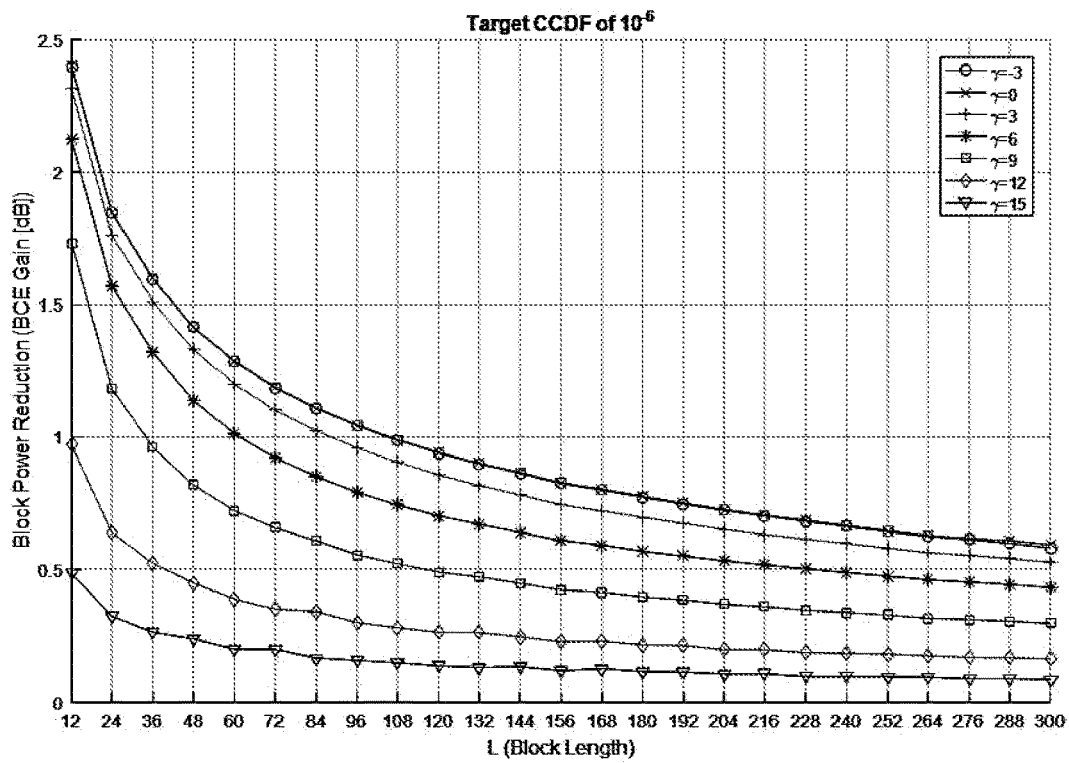
FIG. 31, FIG. 32, FIG. 33, FIG. 34 and FIG. 35 show BCE gain at CCDF=$10^{-6}$, $10^{-9}$, $10^{-12}$, $10^{-15}$ and $10^{-20}$ for L=12:12:300 for BICM respectively.
Figure 32:
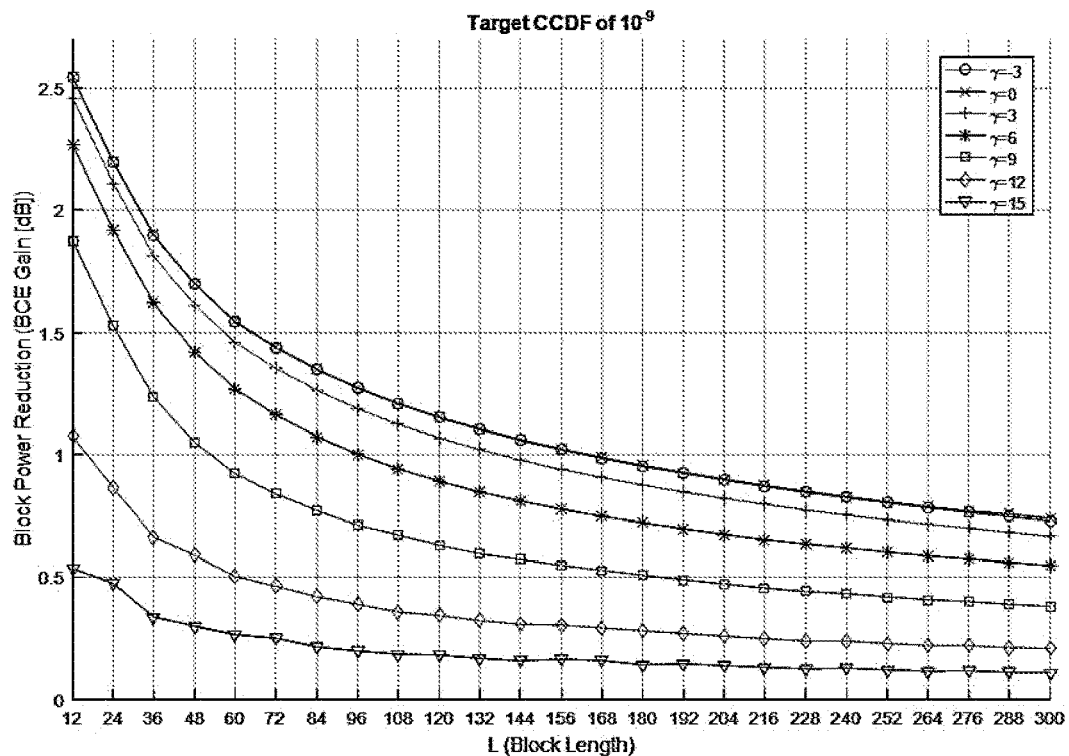
Figure 33:
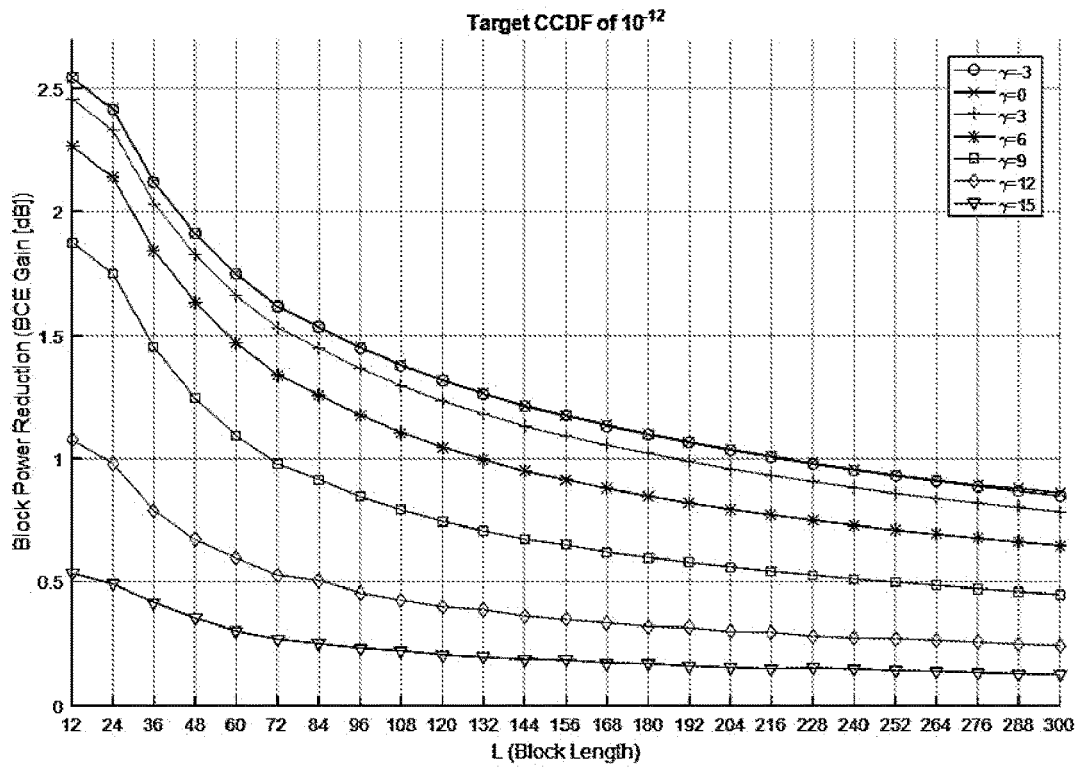
Figure 34:
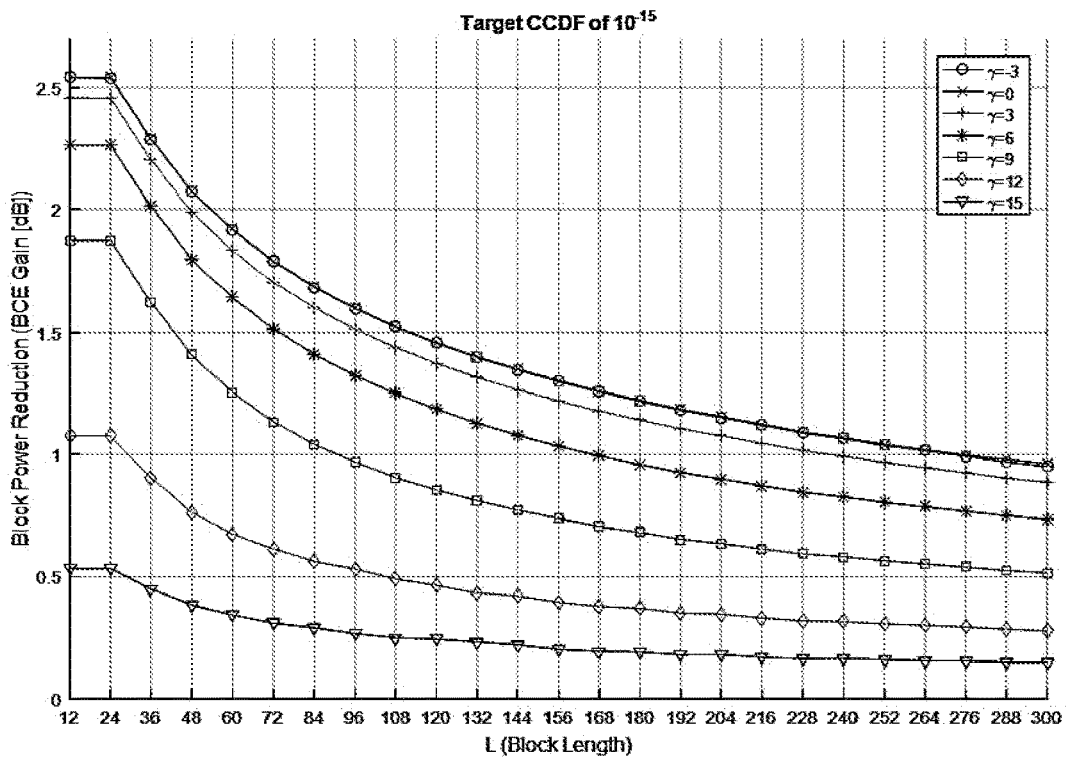
Figure 35:
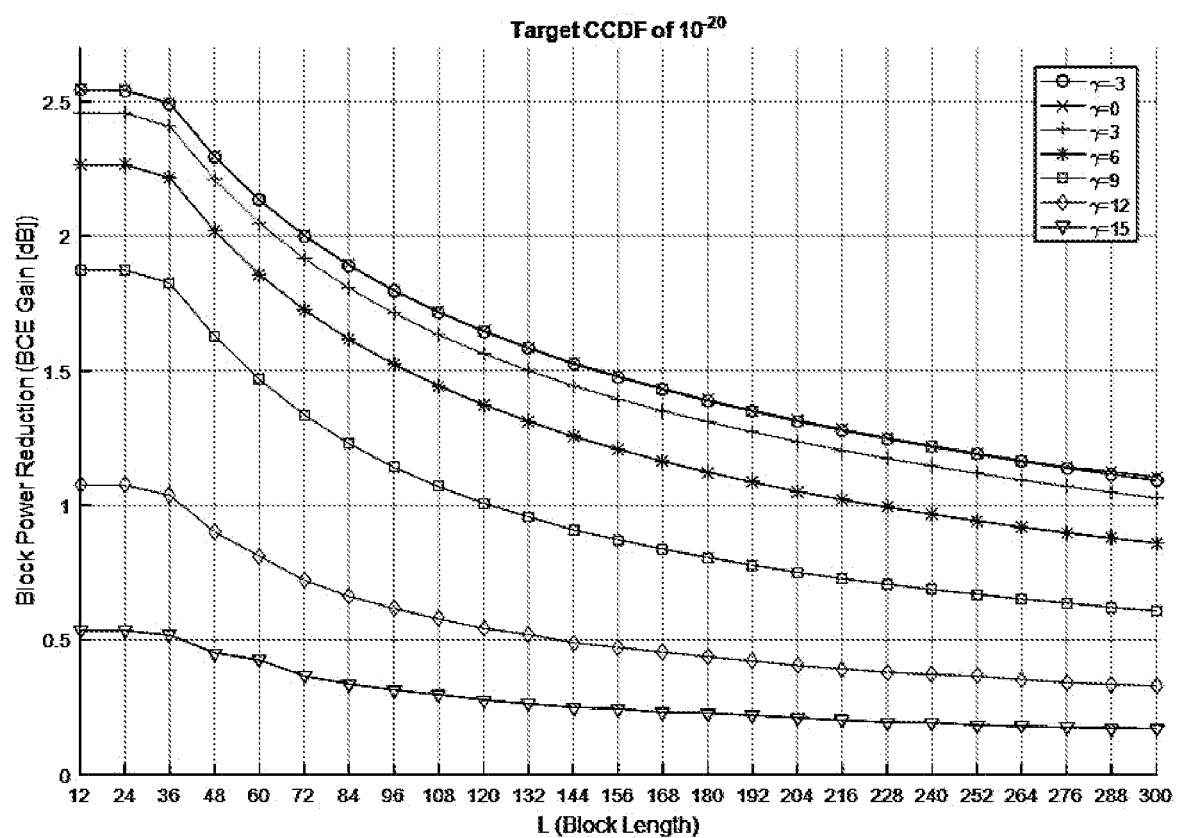

In FIG. 30, CDF ($F_W$) and CCDF ($\overline{F}_W$) of block power is given for a 16-QAM modulated frame of L=48 symbols for SNR=0, 5, 10 and 15 dB. For the target CCDF of $10^{-6}$, the BCE decreases the block power by 1.41 dB, 1.21 dB, 0.68 dB and 0.24 dB for SNR values 0, 5, 10 and 15 dB, respectively.

3.1 BCE Gain Results for 16-QAM BICM

FIG. 31, FIG. 32, FIG. 33, FIG. 34 and FIG. 35 show the gain of the BCE for the targeted CCDF values of $10^{-6}$, $10^{-9}$, $10^{-12}$, $10^{-15}$ and $10^{-20}$ for block lengths L=12 to L=300 in steps of 12 for 16-QAM BICM.

REFERENCES

[1] G. Caire, G. Taricco, and E. Biglieri, "Bit-interleaved coded modulation," IEEE Trans. Inform. Theory, vol. 44, pp. 927-945, May 1998.

What is claimed is:

1. A method for equalizing a capacity of a plurality of blocks, formed at a modulator and indicate an amount of information reliably transmitted to a receiver, to increase performance and decrease a wasted power of a communication system, comprising the steps of:
   computing modulation symbol capacities transmitted over a channel and a plurality of bits forming a plurality of modulation symbols in a transmitter,
   computing a block capacity by using the modulation symbol capacities and a distribution of the plurality of modulation symbols forming each of the plurality of blocks,
   increasing a capacity of a plurality of low capacity blocks to a predetermined targeted capacity by increasing a transmitted block power of the plurality of blocks,
   decreasing a power of the plurality of blocks having excess capacity in amount to equalize the capacity of the plurality of blocks with a targeted capacity.

2. The method according to claim 1, further comprising the step of determining a plurality of negative capacity bits and erasing the plurality of negative capacity bits with an iterative demodulation technique to improve performance of the receiver in a presence of a negative bit-symbol capacity.

* * * * *